United States Patent [19]
Scholl et al.

[11] Patent Number: 5,663,226
[45] Date of Patent: Sep. 2, 1997

[54] RUBBER MIXTURES CONTAINING REINFORCING ADDITIVES, WHICH ADDITIVES INCLUDE SULPHUR AND SILICON

[75] Inventors: Thomas Scholl, Bergisch Gladbach; Hermann-Josef Weidenhaupt, Nörvenich; Ulrich Eisele, Leverkusen, all of Germany

[73] Assignee: Bayer AG, Leverkusen, Germany

[21] Appl. No.: 391,508

[22] Filed: Feb. 21, 1995

[30] Foreign Application Priority Data

Mar. 3, 1994 [DE] Germany ............... 44 06 947.2

[51] Int. Cl.$^6$ ............................................. C08K 5/24
[52] U.S. Cl. ................ 524/262; 524/82; 524/100; 524/110; 524/188; 525/54.45; 525/244; 525/261; 525/264; 525/279; 525/281; 525/284; 525/288
[58] Field of Search ................. 524/100, 262, 524/188, 82, 110; 525/244, 54.45, 261, 264, 279, 281, 284, 288

[56] References Cited

U.S. PATENT DOCUMENTS 4,709,065  11/1987  Yoshioka et al. ............... 556/428

FOREIGN PATENT DOCUMENTS 0096945  3/1992  Japan ............... 524/262

*Primary Examiner*—Judy M. Reddick
*Attorney, Agent, or Firm*—Connolly and Hutz

[57] ABSTRACT

The rubber mixtures according to the invention, containing at least one vulcanising agent, a filler, optionally other rubber additives and at least one reinforcing additive of the formula $$R^1R^2R^3Si-X^1-(-S_x-Y-)_m-(-S_x-X^2-SiR^1R^2R^3)_n$$

are used for the preparation of vulcanised rubbers, wherefrom in particular tires having a low rolling resistance combined with a good wet skid resistance and a high abrasion resistance can be produced.

4 Claims, No Drawings

RUBBER MIXTURES CONTAINING REINFORCING ADDITIVES, WHICH ADDITIVES INCLUDE SULPHUR AND SILICON

The present invention relates to new rubber mixtures containing reinforcing additives which additives include sulphur and silicon and the use of the said rubber mixtures for the production of vulcanised rubber. The vulcanised rubbers according to the invention are suitable for the production of composites, in particular for the production of tires, which show a low rolling resistance combined with a good wet skid resistance and a high abrasion resistance.

Vulcanisates exhibiting improved hysteresis behaviour which are also employed in the production of tires are known, but they have a number of undesirable properties. Thus in EP 253 365 there are described certain nitrosamines which are intended to improve hysteresis behaviour. However, with these compounds there is the danger that nitrosamines may be liberated. For this reason there is a desire for rubber additives which are free from nitro groups and nitroso groups. Similar doubts exist in connection with the nitrosoanilines which, according to U.S. Pat. No. 4,690,965, are used to improve hysteresis behaviour. Vulcanised rubbers displaying reduced hysteresis losses and containing specific diphenyl sulphides are also known from EP 366 952. There is the disadvantage, however, that the said additives are virtually ineffective in natural rubber and furthermore decompose the rubber (on this point, see U.S. Pat. No. 2,470,948). In DE-OS 2 141 159, 2 141 160 and 2 255 577 specific organosilanes are described as reinforcing additives in particular for vulcanised rubbers containing silica. The use of such organosilanes for the production of treads filled with silica is also described in EP 447 066. The rolling resistance of the tires has been successfully lowered through the combination of substances based on silica and organosilanes without, as is otherwise usual, the abrasion resistance and the wet skid resistance of the tires being impaired. In the known organosilanes, however, the hysteresis behaviour and the reinforcing effects are worthy of improvement, in particular the hardness and the modulus of the correspondingly reinforced rubbers.

The present invention therefore provides rubber mixtures containing at least one rubber, a vulcanising agent, a filler, optionally other rubber additives and at least one reinforcing additive of the formula

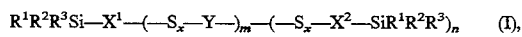

wherein

- $R^1$, $R^2$ and $R^3$ are identical or different and signify $C_1$–$C_8$ alkyl, $C_1$–$C_8$ alkoxy, phenyl or phenoxy, provided that at least one of the radicals $R^1$ to $R^3$ is an alkoxy or phenoxy group,
- $X^1$ and $X^2$ are identical or different and represent divalent, linear or branched, optionally unsaturated $C_1$–$C_{12}$ alkyl radicals,
- Y represents divalent, trivalent or tetravalent linear, branched or cyclic, optionally unsaturated $C_1$–$C_{18}$ alkyl radicals optionally substituted by $C_6$–$C_{12}$ aryl, $C_1$–$C_8$ alkoxy or hydroxy groups, which can be interrupted by atoms of oxygen, sulphur or nitrogen or by aromatic $C_6$–$C_{12}$ aryl groups, and also represents $C_6$–$C_{12}$ aryl groups or heteroaryl groups,
- m represents an integer from 1 to 20,
- n represents a number from 1 to 6, and
- x represents a number from 1 to 6, wherein the reinforcing additive is used in quantities of from 0.1 to 15% by weight, referred to the quantity of rubber used in each case.

The rubber mixtures according to the invention contain preferably from 0.1 to 10% by weight, particularly preferably from 1 to 7.5% by weight, of reinforcing additives.

The rubber mixtures according to the invention contain preferably those reinforcing additives of the above formula wherein $X^1$ and $X^2$ signify methylene, propylene, butylene, pentylene or hexylene radicals and Y represents a methylene, ethylene, propylene, butylene, hexylene, cyclohexylene, octylene, decylene, dodecylene, 2,2'-oxydiethylene, 2,2'-thiodiethylene, 2-hydroxy-propylene, N-methyl-N',N"-diethylene or α,α'-p-xylidene, 1,2,3-propylidene, N,N',N"-triethylene or 1,3,5-s-triazinyl radical, and wherein n represents integers from 1 to 6 and m represents integers from 1 to 10.

Reinforcing additives corresponding to the formulae given below are particularly preferred:

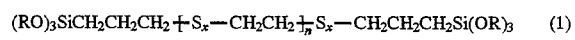 (1)

wherein $R=CH_3, C_2H_5$, $x=1–6$, $n=1–10$,

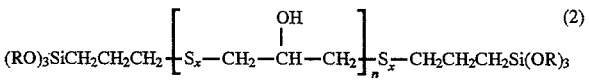 (2)

wherein $R=CH_3, C_2H_5$, $x=1–6$, $n=1–10$,

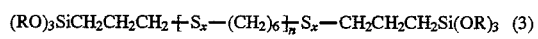 (3)

wherein $R=CH_3, C_2H_5, C_3H_7$, $n=1–10$, $x=1–6$,

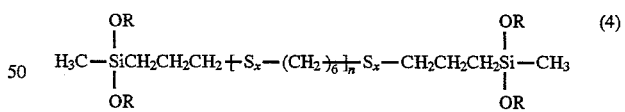 (4)

wherein $R=CH_3, C_2H_5, C_3H_7$, $n=1–10$, $x=1–6$,

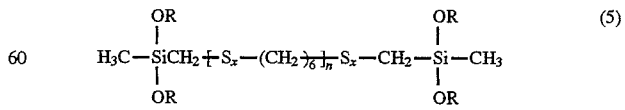 (5)

wherein $R=CH_3, C_2H_5, C_3H_7$, $n=1–10$, $x=1–6$, $$(RO)_3Si-CH_2CH_2CH_2-[-S_x-CH_2CH_2OCH_2CH_2-]_n-S_x-CH_2CH_2CH_2Si(OR)_3 \quad (6)$$

wherein
R=$CH_3$, $C_2H_5$, $C_3H_7$,
n=1–10,
x=1–6, $$(RO)_3Si-CH_2CH_2CH_2-[-S_x-CH_2-\underset{\diagup\!\!\!\diagdown}{\bigcirc}-CH_2-]_n-S_x-CH_2CH_2CH_2Si(OR)_3$$

wherein
R=$CH_3$, $C_2H_5$, $C_3H_7$,
n=1–10,
x=1–6, $$(RO)_3Si-CH_2CH_2CH_2-[-S_x-\underset{\substack{N\!\!\!\diagup\!\!\!\diagdown\!\!\!N\\ \diagdown\!\!\!\diagup\\ R'}}{N}-S_x-CH_2CH_2CH_2Si(OR)_3]_n \quad (8)$$

wherein
R=$CH_3$, $C_2H_5$, $C_3H_7$,
R'=$CH_3$, $C_2H_5$, $C_3H_7$, $C_6H_5$ $OCH_3$, $OC_2H_5$, $OC_3H_7$, $OC_6H_5$
n=1–10,
x=1–6, $$(RO)_3Si-CH_2CH_2CH_2-[-S_x-(CH_2)_6-]_r-[-S_x-(CH_2)_8-]_p-CH_2CH_2CH_2Si(OR_3) \quad (9)$$

wherein
R=$CH_3$, $C_2H_5$, $C_3H_7$,
r+p=2–10,
x=1–6,

Reinforcing additives corresponding to the following formulae are particularly preferred:

$$(RO)_3SiCH_2CH_2CH_2-[-S_x-(CH_2CH_2)_6-]_n-S_x-CH_2CH_2CH_2-Si(OR)_3$$

$$(RO)_3SiCH_2CH_2CH_2-\left[S_x-CH_2-\underset{OH}{CH}-CH_2\right]_n-S_x-CH_2CH_2CH_2Si(OR)_3$$

wherein X=1 to 6 and n=1 to 4.

The reinforcing additives according to the invention can be used both individually and mixed with one another. In this connection there can be used either the individual compounds having a defined molecular weight, or an oligomeric mixture having a defined molecular weight distribution. For reasons of technical processing it is in many cases easier to prepare an oligomeric or polymeric mixture of the said reinforcing additives and to use these in the oligomeric or polymeric form. If the reinforcing additives are used in the form of oligomers or polymers, they have an average molecular weight of approximately 500 to 8000, determined by gel permeation chromatography.

The preparation of the new reinforcing additives according to the invention can be carried out in various ways:

A. By reaction of mercapto group-containing silanes and dimercaptans and/or polymercaptans with sulphur dichloride or disulphur dichloride, accompanied by splitting off of hydrogen chloride. The reaction can be carried out in a manner known per se at temperatures of from −30° to +80° C., optionally in the presence of solvents such as alcohols or aromatic hydrocarbons:

(7)

$$R^1R^2R^3Si-X-SH+HS-Y-SH+S_xCl_2 \rightarrow R^1R^2R^3Si-X_{x+2}-(Y-S_{x-2})_m-X-SiR^1R^2R^3+HCl$$

For information on the performance of the reaction, reference may be made to Houben-Weyl, Methoden der organischen Chemie, Volume 9, pages 88 ff. (1955) and Volume E 11 (1985), Thieme Verlag, Stuttgart.

B: The preparation of the reinforcing agents according to the invention is carried out particularly advantageously if haloalkylsilyl ethers and polyhalides are reacted with metallic polysulphides in the presence of alcoholic solvents at temperatures of from approximately −20° to +90° C.:

$$R^1R^2R^3Si-X-Hal+Hal-Y-Hal+MeS_x \rightarrow R^1R^2R^3Si-X_x-(Y-S_x)_m-X-SiR^1R^2R^3+MeHal$$

The metallic polysulphides preferably used are those wherein Me represents lithium, sodium or potassium and x signifies a number from 2 to 6. The alcoholic solutions preferably used are methanol, ethanol, propanol, butanol, amyl alcohol, hexyl alcohol, octanol, ethylene glycol and propylene glycol, butanediol and/or hexanediol and the isomers thereof.

The reinforcing additives according to the invention can be added to the rubber mixtures both in pure form and attached to an inert organic or inorganic carrier. Suitable carrier materials are in particular silica, natural or synthetic silicates, aluminium oxide and carbon black.

The following are suitable fillers for the vulcanised rubbers according to the invention:

highly dispersed silica prepared, for example, by precipitation of silicates from solvents or by flame hydrolysis of silicon halides having specific surfaces of from 5 to 1000 m²/g, preferably from 20 to 400 m²/g (BET surface) and initial particle sizes of from 100 to 400 nm. The silica may optionally also be present as mixed oxides together with other metal oxides such as the oxides of Al, Mg, Ca, Ba, Zn, Zr, Ti, synthetic silicates such as aluminium silicate or alkaline earth silicates such as magnesium silicate or calcium silicate, having BET surfaces of from 20 to 400 m²/g and initial particle sizes of from 10 to 400 nm, natural silicates, such as kaolin and other naturally occurring silica, glass fibres and glass fibre products (fibre glass mat, filaments) or beads.

Preferably highly dispersed silica having BET surfaces of from 20 to 400 m²/g are used.

The above-mentioned fillers are used in quantities of from 0 to 150% by weight, preferably from 10 to 100% by weight, referred to the quantity of rubber used in each case. In addition, carbon blacks may be added to the said fillers. The carbon blacks to be used in this connection are prepared by the lampblack process, the furnace process or the thermal black process and have BET surfaces of from 20 to 200 m²/g. Examples are SAF black, ISAF black, IISAF black, HAF black, FEF black or GPF black.

The said fillers can be used alone or mixed with one another. In a particularly preferred embodiment, the rubber mixtures contain as fillers a mixture of light fillers, such as highly dispersed silica, and carbon blacks, with the ratio of mixture of light fillers to carbon blacks being 0.05 to 20, preferably 0.1 to 10. The vulcanising agents used for the rubber mixtures according to the invention are peroxides, sulphur, magnesium oxide and zinc oxide, to which may be added the known vulcanisation accelerators such as mercaptobenzothiazole, mercaptosulphenamides, thiurams and thiocarbonates. Both the vulcanisation accelerator and the vulcanising agent can be used individually or mixed with one another. Sulphur is particularly preferably used as the vulcanising agent. The vulcanising agent and the vulcanisation accelerator are each used in quantities of from 0.1 to 10% by weight, preferably 0.1 to 5% by weight, referred to the rubber used in each case.

To the rubber mixtures according to the invention there may, of course, be added yet further rubber additives such as reaction accelerators, antioxidants, heat stabilisers, light stabilisers, antiozonants, processing agents, softeners, tackifiers, blowing agents, dyes, pigments, waxes, extenders, organic acids, reaction retardants, metal oxides as well as activators such as triethanolamine, polyethylene glycol, hexanetriol, all of which are familiar to the rubber expert.

The said rubber additives are employed in conventional quantities (from 0.1 to 30% by weight, referred to the rubber used in each case). The most advantageous quantity of auxiliary substance can easily be established by preliminary tests and depends incidentally on the respective intended use of the vulcanised rubbers.

Besides natural rubber, synthetic rubbers are also suitable for the preparation of the rubber mixtures according to the invention. Examples of preferred synthetic rubbers are described in W. Hofmann, Kautschuktechnologie, Gentner Verlag, Stuttgart, 1980. They include polybutadiene, butadiene-acrylic acid $C_{1-4}$ alkyl ester copolymers, polychloroprene, polyisoprene, styrene-butadiene copolymers having styrene contents of from 1 to 60% by weight, preferably from 20 to 50% by weight, isobutylene-isoprene copolymers, butadiene-acrylonitrile copolymers having acrylonitrile contents of from 5 to 60% by weight, preferably from 10 to 50% by weight, partly hydrogenated or completely hydrogenated butadiene-acrylonitrile copolymers and ethylene-propylene-diene copolymers. The rubbers may, of course, also be used in mixtures with one another. In particular anionically polymerised styrene-butadiene solvent polymers having a glass temperature of above 50° C., which can be modified optionally with silyl ethers or other functional groups, as well as mixtures thereof with diene rubbers, are of interest for the production of automobile tires (see, for example, EP-A 447 066).

The preparation of the rubber mixtures is carried out in a conventional manner in known mixing equipment such as rolls, kneaders and extruders, with mixtures at temperatures of from 100° C. to 200° C. and at shear rates of from 1 to 1000 s⁻¹.

The reinforcing additives according to the invention as well as the fillers are added preferably during the first part of the mixing process, with mixtures at temperatures of from 100° to 200° C. and at the shear rates mentioned. But the addition can also take place subsequently at lower temperatures, 40° to 100° C., for example, together with the sulphur and vulcanisation accelerators.

The rubber mixtures according to the invention can be vulcanised in the conventional manner (see, for example, G. Alliger, I. J. Sjothun, Vulcanization of Elastomers, Reinhold Publishing Corporation, New York, 1964). Here the vulcanisation is carried out at temperatures of from approximately 100° to 200° C., preferably from 130° to 180° C., optionally at pressures of from 10 to 200 bar.

The vulcanised rubbers according to the invention are suitable in particular for the production of composites, for example, for the production of cable sheathings, tubing, transmission belts, conveyor belts, rolls, shoe soles, sealing rings and damping devices, but preferably for the production of tires.

EXAMPLES

Example 1

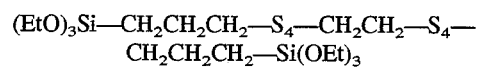

$(EtO)_3Si—CH_2CH_2CH_2—S_4—CH_2CH_2—S_4—CH_2CH_2CH_2—Si(OEt)_3$ 27.0 g (0.2 mol) of disulphur dichloride was added at 5°–10° C. to 47.6 g (0.2 mol) of 3-mercaptopropyl-triethoxysilane and 9.4 g (0.1 mol) of 1,2-dimercaptoethane dissolved in 50 ml of absolute ethanol. After the solution has been stirred for 20 hours at room temperature, the solvent and the dissolved hydrogen chloride gas were removed under vacuum. 69.1 g (99.6%) of a slightly viscous yellow oil was obtained.

¹H-NMR (CDCl₃): 0.7–0.8 ppm (multiplet, 4 protons), 1.2–1.3 ppm (triplet, 18 protons), 1.8–2.0 ppm (4 protons), 2.8–3.1 ppm (multiplet, 4 protons), 3.3–3.5 ppm (multiplet, 4 protons), 3.7–3.9 ppm (quartet, 12 protons).

| | Elemental analysis: | | | | |
|---|---|---|---|---|---|
| | C | H | S | Si | |
| Calcd.: | 34.6 | 6.6 | 36.9 | 8.1 | % |
| Found: | 34.6 | 6.8 | 37.2 | 7.5 | % |

Example 2

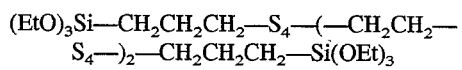

$(EtO)_3Si—CH_2CH_2CH_2—S_4—(—CH_2CH_2—S_4—)_2—CH_2CH_2CH_2—Si(OEt)_3$ 40.5 g (0.3 mol) of disulphur dichloride was added at 5°–10° C. to 47.6 g (0.2 mol) of 3-mercaptopropyl-triethoxysilane and 18.8 g (0.2 mol) of 1,2-dimercaptoethane dissolved in 50 ml of absolute ethanol. After the solution has been stirred for 20 hours at room temperature, the solvent and the dissolved hydrogen chloride gas were removed under vacuum, with the temperature finally being raised to 90° C. 81 g (98.2%) of a slightly viscous yellow oil was obtained.

| Elemental analysis: | | | | | |
|---|---|---|---|---|---|
| | C | H | S | Si | |
| Calcd.: | 31.1 | 5.9 | 45.2 | 6.6 | % |
| Found: | 31.1 | 6.1 | 45.0 | 6.8 | % |

Example 3

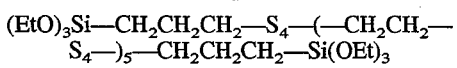
(EtO)$_3$Si—CH$_2$CH$_2$CH$_2$—S$_4$—(—CH$_2$CH$_2$—S$_4$—)$_5$—CH$_2$CH$_2$CH$_2$—Si(OEt)$_3$ 40.5 g (0.3 mol) of disulphur dichloride was added at 5°–10° C. to 23.8 g (0.1 mol) of 3-mercaptopropyl-triethoxysilane and 23.5 g (0.25 mol) of 1,2-dimercaptoethane dissolved in 50 ml of absolute ethanol. The solution was stirred for 20 hours at room temperature, in the course of which a pale yellow solid precipitated out. The solvent and the dissolved hydrogen chloride gas were then removed under vacuum and finally the temperature was raised to 90° C.

Example 4

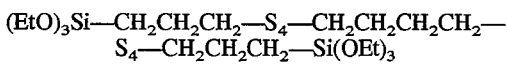
(EtO)$_3$Si—CH$_2$CH$_2$CH$_2$—S$_4$—CH$_2$CH$_2$CH$_2$CH$_2$—S$_4$—CH$_2$CH$_2$CH$_2$—Si(OEt)$_3$ 8.5 g (0.25 mol) of hydrogen sulphide was introduced at room temperature into 17 g of a 20% by weight ethanolic sodium ethylate solution (0.5 mol). 24 g (0.75 mol) of sulphur was then added and the reaction mixture was heated to 70° C. over a period of 1 hour. Subsequently 60.1 g (0.25 mol) of 3-chloropropyltrioxysilane was added dropwise at 70° C., stirring was then carried out at the same temperature for one hour and 15.9 g (0.125 mol) of 1,4-dichlorobutane was added. After stirring for 5 hours at reflux temperature, the reaction mixture was filtered and the filtrate concentrated by evaporation under vacuum. 85 g (93%) of a yellowish brown oil was obtained.

$^1$H-NMR (CDCl$_3$): 0.7–0.8 ppm (multiplet, 4 Si—CH$_2$ protons), 1.2–1.3 ppm (triplet, 18 CH$_3$ protons), 1.7–2.0 ppm (multiplet, 8 C—CH$_2$—C protons), 2.7–3.1 ppm (multiplet, 8 S—CH$_2$—C protons), 3.8–3.9 ppm (quartet, 12 O—CH$_2$—C protons).

Example 5

(EtO)$_3$Si—CH$_2$CH$_2$CH$_2$—S$_4$—CH$_2$CH$_2$CH$_2$CH$_2$CH$_2$CH$_2$—S$_4$—CH$_2$CH$_2$CH$_2$—Si(OEt)$_3$ 27.0 g (0.2 mol) of disulphur dichloride was added at 5°–10° C. to 47.6 g (0.2 mol) of 3-mercaptopropyl-triethoxysilane and 15 g (0.1 mol) of 1,6-dimercaptohexane dissolved in 50 ml of absolute ethanol, with liberation of HCl. The reaction mixture was then stirred for 20 h at room temperature and the solvent and the dissolved hydrochloric acid were subsequently removed under vacuum. 73.9 g (98.5%) of a yellow oil of low viscosity was obtained.

$^1$H-NMR (CDCl$_3$): 0.7–0.8 ppm (multiplet, Si—CH$_2$ protons), 1.2–1.3 ppm (triplet, CH$_3$ protons), 1.4–1.5 ppm (multiplet, CH$_2$ protons), 1.7–2.0 ppm (multiplet, C—CH$_2$—C protons), 2.6–3.1 ppm (multiplet, S—CH$_2$—C protons), 3.7–3.9 ppm (quartet, O—CH$_2$—C protons).

Example 6

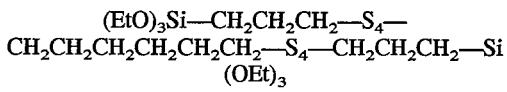
(EtO)$_3$Si—CH$_2$CH$_2$CH$_2$—S$_4$—(CH$_2$CH$_2$CH$_2$CH$_2$CH$_2$CH$_2$—S$_4$)$_2$—CH$_2$CH$_2$CH$_2$—Si(OEt)$_3$ 40.5 g (0.3 mol) of disulphur dichloride was added at 5°–10° C. to 47.6 g (0.2 mol) of 3-mercaptopropyl-triethoxysilane and 30 g (0.2 mol) of 1,6-dimercaptohexane dissolved in 50 ml of absolute ethanol. The reaction mixture was subsequently stirred for 20 h at room temperature and the solvent and the dissolved hydrochloric acid were then removed under vacuum. 95.2 g (97%) of a slightly viscous yellow oil was obtained.

$^1$H-NMR (CDCl$_3$): 0.7–0.8 ppm (multiplet, Si—CH$_2$ protons), 1.2–1.7 ppm (triplet, CH$_3$ protons), 1.4–1.5 ppm (multiplet, CH$_2$ protons), 1.7–2.0 ppm (multiplet, C—CH$_2$—C protons), 3.7–3.9 ppm (quartet, O—CH$_2$—C protons).

Example 7

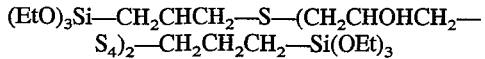
(EtO)$_3$Si—CH$_2$CHCH$_2$—S—(CH$_2$CHOHCH$_2$—S$_4$)$_2$—CH$_2$CH$_2$CH$_2$—Si(OEt)$_3$ 12.75 g (0.375 mol) of hydrogen sulphide was introduced into a solution of 51.0 g (0.75 mol) of sodium ethylate in 270 ml of ethanol. 36 g (1.125 mol) of sulphur was then added and the reaction mixture was stirred for half an hour at 70° C. Subsequently 60.1 g of 3-chloropropyl-triethoxysilane was added dropwise and stirring continued for one hour. 32.3 g (0.25 mol) of 1,3-dichloropropanol was then added. After stirring for 8 hours under reflux, the reaction mixture was filtered and the solvent removed under vacuum. 108 g of a yellowish brown oil was obtained.

Test of the activity of the new reinforcing agents in an SBR vulcanisate filled with SiO$_2$ The following mixtures were prepared in a kneader at an internal temperature of 150° C. Sulphur and accelerator were mixed in subsequently on the roll at 50° C. To carry out the vulcanisation, the mixtures were heated to 160° C. in heatable presses over a period of 25 minutes.

| Formulation | Comp 1 | Comp 2 | A | B | C |
|---|---|---|---|---|---|
| SBR rubber (Buna EM 1500) | 70 | 70 | 70 | 70 | 70 |
| SBR rubber (Buna EM 1778) | 41 | 41 | 41 | 41 | 41 |
| Silica (Vulkasil S) | 50 | 50 | 50 | 50 | 50 |
| Zinc oxide | 3 | 3 | 3 | 3 | 3 |
| Stearic acid | 2 | 2 | 2 | 2 | 2 |
| Diethylene glycol | 1.5 | 1.5 | 1.5 | 1.5 | 1.5 |
| Cumarone resin (B2/75) | 5 | 5 | 5 | 5 | 5 |
| Octylated diphenylamine (Vulkanox OCD) | 1 | 1 | 1 | 1 | 1 |
| Bis-triethoxysilylpropyl tetrasulphide acc. to DE-OS 2 255 577 | — | 3.5 | — | — | — |
| Compound according to Eg. 5 | — | — | 3.5 | — | — |
| Compound according to Eg. 6 | — | — | 3.5 | — | — |
| Compound according to Eg. 4 | — | — | — | — | 3.5 |
| On the roll/ mixed in at 50° C.: | | | | | |
| Tetramethylthiuram disulphide | 0.1 | 0.1 | 0.1 | 0.1 | 0.1 |
| Sulphur | 2 | 2 | 2 | 2 | 2 |
| Cyclohexyl mercaptobenzothiazole sulphenamide | 1.5 | 1.5 | 1.5 | 1.5 | 1.5 |

Mechanical properties of the vulcanisate:

| | | | | | |
|---|---|---|---|---|---|
| Modulus 300 (MPa) | 1.37 | 7.49 | 7.69 | 7.93 | 7.4 |
| Strength (MPa) | 12.3 | 17.1 | 12.7 | 14.1 | 17.4 |
| Extensibility (%) | 911 | 548 | 460 | 488 | 551 |
| Hardness (Shore A) | 56 | 54 | 65 | 65 | 65 |
| Elasticity (70° C.) | 44 | 60 | 60 | 60 | 60 |
| Abrasion (DIN 53516) | 279 | — | 139 | 137 | 128 |
| tan delta (60° C.) | 0.169 | 0.104 | 0.100 | 0.093 | — |

The tests prove that the compounds according to the invention are very effective reinforcing additives. This is apparent from the distinctly improved modulus, from the greater hardness and from the improved abrasion resistance. The dynamic energy losses, measured as tan delta at 60° C., are distinctly less than those of the vulcanisate lacking reinforcing additive and in fact less than in the comparison compound according to DE-OS 2 255 577.

We claim:

1. A rubber composition comprising vulcanizable rubber, at least one vulcanizing agent, a filler and 0.1 to 15% by weight, based on vulcanizable rubber of at least one reinforcing additive of the formula

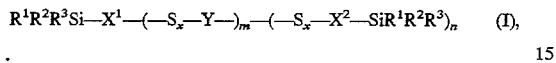

wherein
- $R^1$, $R^2$, and $R^3$ are identical or different and signify $C_1$–$C_8$ alkyl, $C_1$–$C_8$ alkoxy, phenyl or phenoxy, provided that at least one of the radicals $R^1$ to $R^3$ is an alkoxy or phenoxy group;
- $X^1$ and $X^2$ are identical or different and represent divalent, linear or branched $C_1$–$C_{12}$ alkyl or alkylene radicals;
- Y represents a divalent, trivalent or tetravalent linear, branched or cyclic $C_1$–$C_{18}$ alkyl, heteroalkyl, alkylene or heteroalkylene radical which is optionally substituted by $C_6$–$C_{12}$ aryl, $C_1$–$C_8$ alkoxy or hydroxy groups, or represents a $C_6$–$C_{12}$ aryl group or heteroaryl group;
- m represents an integer from 2 to 20,
- n represents a number from 1 to 6, and
- x represents a number from 1 to 6.

2. A rubber composition comprising vulcanizable rubber, at least one vulcanizing agent, a filler and 0.1 to 15% by weight, based on vulcanizable rubber, of at least one reinforcing additive of the formula

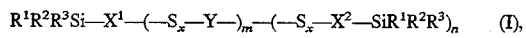

wherein
- $R^1$, $R^2$, and $R^3$ are identical or different and signify $C_1$–$C_8$ alkyl, $C_1$–$C_8$ alkoxy, phenyl or phenoxy, provided that at least one of the radicals $R^1$ to $R^3$ is an alkoxy or phenoxy group;
- $X^1$ and $X^2$ are identical or different and represent methylene, propylene, butylene, pentylene or hexylene radicals;
- Y represents a methylene, ethylene, propylene, butylene, hexylene, cyclohexylene, octylene, decylene, dodecylene, 2,2'-oxydiethylene, 2,2'-thiodiethylene, 2-hydroxy-propylene, N-methyl-N',N"-diethylene or α,α'-p-xylidene, 1,2,3-propylidene, N,N',N"-triethylene or 1,3,5-s-triazinyl radical;
- m represents an integer from 2 to 20,
- n represents a number from 1 to 6, and
- x represents a number from 1 to 6.

3. The composition of claim 1 wherein n represents and integer from 1 to 6 and wherein m represents an integer from 2 to 10.

4. The composition of claim 2 wherein n represents and integer from 1 to 6 and wherein m represents an integer from 2 to 10.

* * * * *